United States Patent
Strebel et al.

(10) Patent No.: US 10,032,267 B2
(45) Date of Patent: Jul. 24, 2018

(54) AUTOMATING THE ASSESSMENT OF DAMAGE TO INFRASTRUCTURE ASSETS

(71) Applicant: LOCKHEED MARTIN CORPORATION, Bethesda, MD (US)

(72) Inventors: Robert Strebel, Endwell, NY (US); Reed Durand, Owego, NY (US); Ryan W. Andrew, Binghamton, NY (US); Joseph R. Grosso, Endicott, NY (US); Timothy Douglas, Lisle, NY (US); Victoria Rose Tagarelli, Endicott, NY (US); Richard T. Evans, Endicott, NY (US); David E. Murphy, Owego, NY (US); Bing C. Li, Vestal, NY (US); Joseph T. Morrison, Apalachin, NY (US); Stephen Ray Shafer, Vestal, NY (US); Benjamin P. Tongue, Vestal, NY (US); Khader S. Fashho, Endicott, NY (US)

(73) Assignee: LOCKHEED MARTIN CORPORATION, Bethesda, MD (US)

( * ) Notice: Subject to any disclaimer, the term of this patent is extended or adjusted under 35 U.S.C. 154(b) by 140 days.

(21) Appl. No.: 15/177,875

(22) Filed: Jun. 9, 2016

(65) Prior Publication Data

US 2017/0358068 A1 Dec. 14, 2017

(51) Int. Cl.
*G06K 9/36* (2006.01)
*G06T 7/00* (2017.01)
(Continued)

(52) U.S. Cl.
CPC .............. *G06T 7/001* (2013.01); *G01S 13/90* (2013.01); *G01S 17/89* (2013.01); *G06K 9/6202* (2013.01);
(Continued)

(58) Field of Classification Search
CPC ...... A63F 13/327; A63F 13/213; A63F 13/25; A63F 13/32; A63F 13/332; A63F 13/335;
(Continued)

(56) References Cited

U.S. PATENT DOCUMENTS

| 5,633,946 A | 5/1997 | Lachinski et al. |
| 7,233,691 B2 | 6/2007 | Setterholm |

(Continued)

FOREIGN PATENT DOCUMENTS

CN 102353355 2/2012

OTHER PUBLICATIONS

Matzner et al., "Automated Damage Assessment forEvent Response from Overhead Imagery",https://ams.confex.com/ams/96Annual/webprogram/Handout/Paper284157/AMSAutomated_Damage_Assessment.pdf, Homeland Security Science and Technology, Accessed Jun. 10, 2016, 16 pages.

(Continued)

*Primary Examiner* — Duy M Dang
(74) *Attorney, Agent, or Firm* — Kent E. Kemeny; Andrew M. Calderon; Roberts Mlotkowski Safran Cole & Calderon, P.C.

(57) ABSTRACT

A computer-implemented method includes: receiving, by a computing device, sensor data associated with a geographic location; processing, by the computing device, the sensor data to identify an infrastructure asset within the geographic location; determining, by the computing device, a condition of the infrastructure asset based on processing the sensor data; and storing or outputting, by the computing device, information regarding the condition of the infrastructure asset.

16 Claims, 17 Drawing Sheets

(51) Int. Cl.
*G01S 13/90* (2006.01)
*G01S 17/89* (2006.01)
*G06K 9/62* (2006.01)

(52) U.S. Cl.
CPC .. *G06K 9/6279* (2013.01); *G06T 2207/10012* (2013.01); *G06T 2207/10032* (2013.01); *G06T 2207/30184* (2013.01)

(58) Field of Classification Search
CPC .......... A63F 13/655; A63F 13/00; G06T 7/55; G06T 3/0068; G06T 15/04; G06T 7/001; G06K 9/00228; G06K 9/6202; G06K 9/6279; G01S 13/90; G01S 17/89
See application file for complete search history.

(56) References Cited

U.S. PATENT DOCUMENTS

| | | | |
|---|---|---|---|
| 8,275,547 | B2 | 9/2012 | Rousselle et al. |
| 8,275,570 | B2 | 9/2012 | Rousselle |
| 8,352,410 | B2 | 1/2013 | Rousselle et al. |
| 8,374,821 | B2 | 2/2013 | Rousselle et al. |
| 8,510,196 | B1 | 8/2013 | Brandmaier et al. |
| 8,680,994 | B2 | 3/2014 | Leppanen et al. |
| 9,129,355 | B1 | 9/2015 | Harvey et al. |
| 2003/0081827 | A1 | 5/2003 | Paz-Pujalt et al. |
| 2009/0265193 | A1 | 10/2009 | Collins et al. |
| 2011/0066297 | A1 | 3/2011 | Saberi et al. |
| 2012/0101783 | A1 | 4/2012 | Stephens et al. |
| 2012/0154446 | A1 | 6/2012 | Adams et al. |
| 2013/0113831 | A1 | 5/2013 | Giuffrida et al. |
| 2013/0135471 | A1 | 5/2013 | Giuffrida et al. |
| 2013/0138401 | A1 | 5/2013 | Thornberry et al. |
| 2013/0147802 | A1 | 6/2013 | Thornberry et al. |
| 2013/0155109 | A1 | 6/2013 | Schultz et al. |
| 2013/0170694 | A1 | 7/2013 | Thornberry et al. |
| 2013/0205900 | A1 | 8/2013 | Nulty |
| 2013/0208116 | A1 | 8/2013 | Schultz et al. |
| 2013/0208996 | A1 | 8/2013 | Schultz et al. |
| 2013/0212536 | A1 | 8/2013 | Thornberry et al. |
| 2013/0216089 | A1 | 8/2013 | Chen et al. |
| 2013/0315503 | A1 | 11/2013 | Giuffrida et al. |
| 2014/0003707 | A1 | 1/2014 | Thornberry et al. |
| 2014/0009626 | A1 | 1/2014 | Schultz et al. |
| 2014/0029867 | A1 | 1/2014 | Giuffrida et al. |
| 2014/0063243 | A1 | 3/2014 | Giuffrida et al. |
| 2014/0111554 | A1 | 4/2014 | Schultz et al. |
| 2014/0125664 | A1 | 5/2014 | Freund et al. |
| 2014/0126816 | A1 | 5/2014 | Schultz et al. |
| 2014/0126838 | A1 | 5/2014 | Schultz et al. |
| 2014/0188574 | A1 | 7/2014 | Luca |
| 2014/0198211 | A1 | 7/2014 | Giuffrida et al. |
| 2014/0236650 | A1 | 8/2014 | Davenport et al. |
| 2014/0278697 | A1 | 9/2014 | Thornberry et al. |
| 2014/0278708 | A1 | 9/2014 | Byk et al. |
| 2014/0358601 | A1 | 12/2014 | Smiley et al. |
| 2015/0078668 | A1 | 3/2015 | Adams et al. |
| 2015/0092184 | A1 | 4/2015 | Schultz |
| 2015/0170413 | A1 | 6/2015 | Freund et al. |
| 2015/0178416 | A1 | 6/2015 | Stephens et al. |
| 2015/0193988 | A1 | 7/2015 | Jenkins et al. |
| 2015/0221079 | A1 | 8/2015 | Schultz et al. |
| 2015/0227644 | A1 | 8/2015 | Schultz |
| 2015/0254901 | A1 | 9/2015 | Pollock et al. |
| 2015/0269720 | A1 | 9/2015 | Mondello |
| 2015/0302253 | A1 | 10/2015 | Stewart |

OTHER PUBLICATIONS

International Search Report and Written Opinion of the International Searching Authority dated Apr. 14, 2017 in related PCT Application No. PCT/US17/17462, 9 pages.

Zhengrong et al., "Advances in vegetation management for power line corridor monitoring using aerial remote sensing techniques", http://ieeexplore.ieee.org/document/5624431/, IEEE Applied Robotics for the Power Industry (CARPI), Oct. 2010, 4 pages.

International Search Report and Written Opinion of the International Searching Authority dated Apr. 25, 2017 in PCT Application No. PCT/US17/17426, 12 pages.

Office Action dated Feb. 28, 2018 in related U.S. Appl. No. 15/159,362, 42 pages.

1500

Flight Review Summary

Circuits Flown: 1

Circuits Reviewed: 0.4/1 (40%)

Utility Poles Reviewed: 6/15 (40%)

Utility Poles Normal: 2/6 (33%)

Utility Poles Damaged: 4/6 (67%)

| Utility Pole ID | Circuit | Config | County | Street | Coordinates | Status |
|---|---|---|---|---|---|---|
| 10509_2_1 | 10509_2 | 2 | Putnam | Oak | 42.094158, -75.921510 | |
| 10509_2_2 | 10509_2 | 2 | Putnam | Oak | 42.094158, -75.921510 | |
| 10509_2_3 | 10509_2 | 2 | Putnam | Oak | 42.094158, -75.921510 | |
| 10509_2_4 | 10509_2 | 2 | Putnam | Oak | 42.094158, -75.921510 | |
| 10509_2_5 | 10509_2 | 2 | Putnam | Oak | 42.094158, -75.921510 | |
| 10509_2_6 | 10509_2 | 2 | Putnam | Oak | 42.094158, -75.921510 | |
| 10509_2_7 | 10509_2 | 2 | Putnam | Oak | 42.094158, -75.921510 | |
| 10509_2_8 | 10509_2 | 2 | Putnam | Oak | 42.094158, -75.921510 | |
| 10509_2_9 | 10509_2 | 2 | Putnam | Oak | 42.094158, -75.921510 | |
| 10509_2_10 | 10509_2 | 2 | Putnam | Oak | 42.094158, -75.921510 | |
| 10509_2_11 | 10509_2 | 2 | Putnam | Oak | 42.094158, -75.921510 | |
| 10509_2_12 | 10509_2 | 2 | Putnam | Oak | 42.094158, -75.921510 | |
| 10509_2_13 | 10509_2 | 2 | Putnam | Oak | 42.094158, -75.921510 | |
| 10509_2_14 | 10509_2 | 2 | Putnam | Oak | 42.094158, -75.921510 | |
| 10509_2_15 | 10509_2 | 2 | Putnam | Oak | 42.094158, -75.921510 | |

FIG. 15

AUTOMATING THE ASSESSMENT OF DAMAGE TO INFRASTRUCTURE ASSETS

FIELD OF INVENTION

The present invention relates to infrastructure damage assessment, and more particularly, to utilizing sensor and imagery data to automatically assess infrastructure damage.

BACKGROUND

Infrastructure assets, such as utility poles, electrical wires, gas lines, water lines, etc. may become damaged as a result of natural disasters (e.g., severe thunderstorms, hail, wind, hurricanes, floods, tornadoes, blizzards, etc.), manmade disasters, wear-and-tear, etc. Damage to infrastructure assets causes service interruptions, which can be inconvenient, and create supply and manpower shortages.

Repairing damaged infrastructure involves assessing infrastructure damage in order to determine which assets are damaged, the extent of the damage, and dispatching the proper repair personnel and equipment to repair damaged infrastructure based on the extent of the damage. Assessing damaged infrastructure is typically a time-consuming process, which in turn, delays the repair of infrastructure and the restoration of service. For example, assessing damaged infrastructure typically involves in-person observation, sometimes at road or utility line elevation, causing slow assessments, limited accessibility, and increased safety concerns.

SUMMARY

In an aspect of the invention, a computer-implemented method includes receiving, by a computing device, sensor data associated with a geographic location; processing, by the computing device, the sensor data to identify an infrastructure asset within the geographic location; determining, by the computing device, a condition of the infrastructure asset based on processing the sensor data; and storing or outputting, by the computing device, information regarding the condition of the infrastructure asset.

In an aspect of the invention, there is computer program product for automatically assessing damage to infrastructure. The computer program product includes a computer readable storage medium having program instructions embodied therewith. The program instructions are executable by the computing device to receive sensor data collected by a set of sensors implemented in a vehicle; identify, based on the sensor data, an infrastructure asset within a geographic location surveyed by the vehicle; determine an extent of damage to the infrastructure asset based on processing the sensor data; and store or output a report indicating the extent of damage to the infrastructure asset.

In an aspect of the invention, a system includes: a CPU, a computer readable memory and a computer readable storage medium associated with a computing device; program instructions to receive information regarding the extent of damage to an infrastructure asset, wherein the information regarding the extent of damage to the infrastructure asset is automatically determined via processing sensor data implemented in an aerial vehicle that surveys a geographic area defining an area affected by an event that causes damage to infrastructure; and program instructions to display the information regarding the extent of damage to the infrastructure asset. The program instructions are stored on the computer readable storage medium for execution by the CPU via the computer readable memory.

BRIEF DESCRIPTION OF THE DRAWINGS

The present invention is described in the detailed description which follows, in reference to the noted plurality of drawings by way of non-limiting examples of exemplary embodiments of the present invention.

FIGS. 14-16 show example formats of damage assessment reports presented on a user device in accordance with aspects of the present invention.

DETAILED DESCRIPTION

Figure 1:
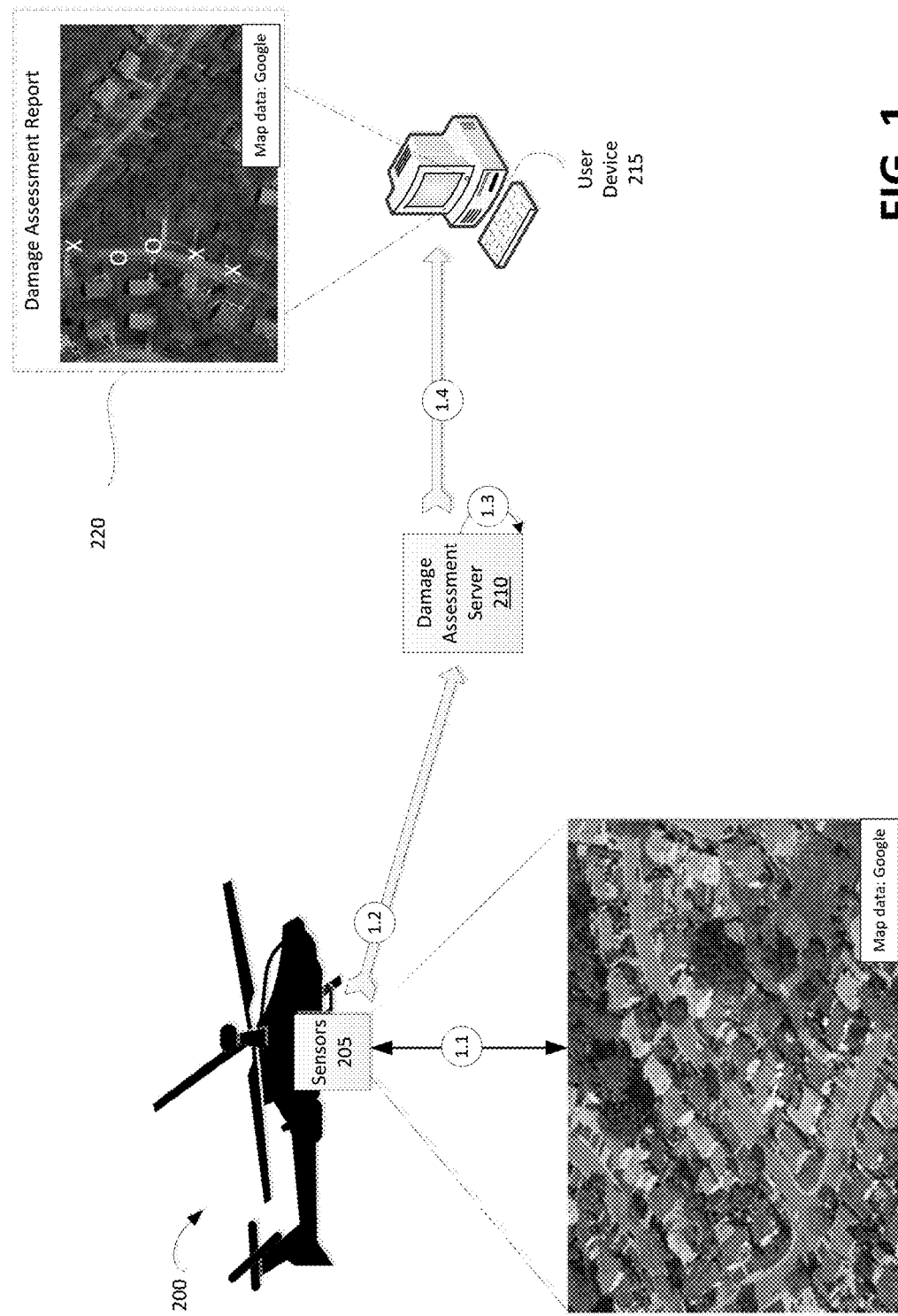
FIG. 1 shows an overview of an example implementation in accordance with aspects of the present invention.

The present invention relates to infrastructure damage assessment, and more particularly, to utilizing sensor and imagery data to automatically assess infrastructure damage. Aspects of the present invention include systems and/or methods to automate the assessment of damage to infrastructure assets (e.g., utility poles, electrical distribution power lines, communication lines, guy wires, gas lines, water lines, communications towers, etc.) based on imagery and sensor data. For example, the systems and/or methods may gather imagery and/or sensor data via aerial vehicles that aerially survey a defined geographic region (e.g., a geographic region affected by a natural disaster or other event in which infrastructure assets may have become damaged). From the sensor data, computer-implemented processing techniques are used to identify three-dimensional (3D) objects in the geographic region, locate assets in the geographic region from the 3D imagery, assess damage to the assets, and generate reports that identify information regarding the assessed damage (e.g., the location of damaged assets, the extent of the damage, etc.). In embodiments, an asset database is provided that includes unique identifiers of assets, expected location information of assets, configuration/connectivity information for assets, and/or other information regarding the assets. As described herein, the asset database may be used to focus sensor analysis on expected locations of assets, and to assess the damage of assets.

Damage assessment response and repair personnel may use the reports to aid in the repair of damaged assets in order to restore service. Further, labor and other resources can be focused sooner on repairing damaged assets rather than assessing damage. The damage assessment reports may also be used to dispatch the best suited repair personnel and equipment that should be deployed to particular damaged assets, thereby expediting repair time, limiting risks to stakeholders, improving estimated time of restoration (ETR), and more efficiently directing material, equipment, and repair crews. Further, the damage assessment reports may be used to more quickly identify the number of repair crews required so that mutual aid and/or other resources can be requested from other parties. For example, the sooner the request for additional manpower and resources, the more likely and quicker the request will be filled, and the less costly it may be to fill the request. For example, delayed requests for additional manpower and resources would result in crews traveling from a further distance, thus increasing travel time and costs. In embodiments, the damage assessment reports may be reviewed and validated by infrastructure administrators. In embodiments, the systems and/or methods described herein may be used to assess the damage of power distribution assets such as utility poles and wires; however, the systems and/or methods are not so limited in that damage may be assessed for other types of assets.

Advantageously, aspects of the present invention provide early definition of repair resources and significantly reduce the time to assess infrastructure damage and thus, reduce the amount of time to restore service. Further, aspects of the present invention provide a more thorough damage assessment than in-person ground inspections, as aerial inspections can obtain imagery and sensor data in areas otherwise inaccessible by ground inspections. Further, safety issues associated with ground inspections are avoided. Aspects of the present invention may also permit automated analysis processing to occur in parallel with the addition of the appropriate computing and processing equipment.

Aspects of the present invention provide 3D imagery of assets from the sensor data rather than two-dimensional (2D) aerial camera images, which do not provide the level of detail required to properly assess damage. For example, aerial 2D images may not provide the level of detail to determine whether a utility pole is damaged, or whether electrical wires connected to the utility pole are damaged. Conversely, 3D imagery provides additional detail to identify that the utility pole is damaged and that the electrical wires connected to the pole are damaged. For example, in 3D imagery, it is possible to determine that an undamaged pole is one that is relatively straight, and an undamaged electrical wire would be connected relatively perpendicular to an undamaged pole. In alternative embodiments, 3D data through the fusion of 2D data may be synthesized with navigational information. Additionally, non-image sensor data (e.g., radio frequency (RF), electromagnetic, chemical gas sniffer, and/or other sensors) may be utilized and fused for damage assessment.

In embodiments, the sensor data may be gathered in a single aerial pass in order to further expedite the damage assessment process. Also, gathering of the sensor data and performing the damage assessment analysis based on the sensor data can occur in a variety of environments (e.g., day/night operation and various weather conditions).

FIG. 1 shows an overview of an example implementation in accordance with aspects of the present invention. As shown in FIG. 1, an aerial vehicle 200 may aerially survey a geographic area defined by a certain flight path. For example, the flight path may correspond to a geographic location affected by a natural disaster. In embodiments, the flight path may be based on expected locations of assets in order to optimize/minimize flight time for data collection. During the flight of the aerial vehicle 200, sensors 205 on the aerial vehicle 200 gather raw data (at step 1.1). Each data point of the sensor data may include multiple attributes, such as location, color, etc. As described in greater detail herein, the raw data includes image-related data that is processed to determine the location of damaged assets, and the extent of the damage.

In embodiments, a damage assessment server 210 may receive the sensor data from the sensors 205 (at step 1.2). The damage assessment server 210 may process the sensor data (at step 1.3) to determine the location of damaged assets and the extent of the damage. For example, as described in greater detail herein, the damage assessment server 210 may process the sensor data by forming imagery from the sensor data and analyzing the sensor data by isolating features of interest to form 3D shapes. In embodiments, the damage assessment server 210 may identify objects from the 3D shapes, and filter out objects that are not of interest (e.g., objects that are not assets). Further, the damage assessment server 210 may identify the types of assets, infer the location of obscured assets (e.g., assets that may not be visible as a result of obstructions, such as trees, buildings etc.), assess the features of the assets to determine the condition of the assets, and determine the types of damage associated with the assets.

The damage assessment server 210 may output damage assessment information (step 1.4) based on processing the sensor data. A user device 215 may receive the damage assessment information, and may display the damage assessment information in a damage assessment report (e.g., as shown in interface 220). In embodiments, the damage assessment report may identify the location of assets on a geographic map, the condition of the assets, (e.g., a level of severity of damage to the assets) and/or the type of damage. The damage assessment report may be in various formats, as described in greater detail herein.

As described herein, the report may be displayed in a variety of formats. In the example shown in FIG. 1, the damage assessment report includes a satellite view of a geographic area that was surveyed, an indication regarding the condition of infrastructure assets. For example, undamaged assets are shown with a notation of "O" and damaged assets are shown with a notation of "X". In alternative embodiments, a report does not need to be generated. For example, damage assessment information may be sent directly to an upstream system, such as a work assignment tool, for the direct deployment of repair crews. The interface could be file based, utilize application programming interface (API) calls, etc.

As described in greater detail herein, the report may be a table that identifies assets and their identifiers, locations, and damage. In embodiments, the report may be a map or satellite view with information regarding asset damage overlaid on the map. The damage assessment report may be used by infrastructure maintenance personnel to dispatch repair personnel to the location in which damaged assets have been identified. Further, the best suited personnel and equipment may be dispatched based on the extent/severity of damage and/or the type of damage.

Since aerial vehicles are used in conjunction with sensors, damage assessment is substantially faster in relation to when damage assessment is performed via using ground vehicles and in-person ground inspections. Advantageously, aspects of the present invention significantly reduce the time to assess infrastructure damage and thus reduce the amount of time to restore service. Further, aspects of the present invention provide a more thorough damage assessment than ground inspections, as aerial inspections can obtain imagery and sensor data in areas otherwise inaccessible by manual ground inspections. As described herein, ground-based vehicles, marine vehicles (e.g., surface or subsurface marine vehicles), manned, unmanned and/or other types of vehicles may be used in addition to or instead of aerial vehicles.

Figure 2:
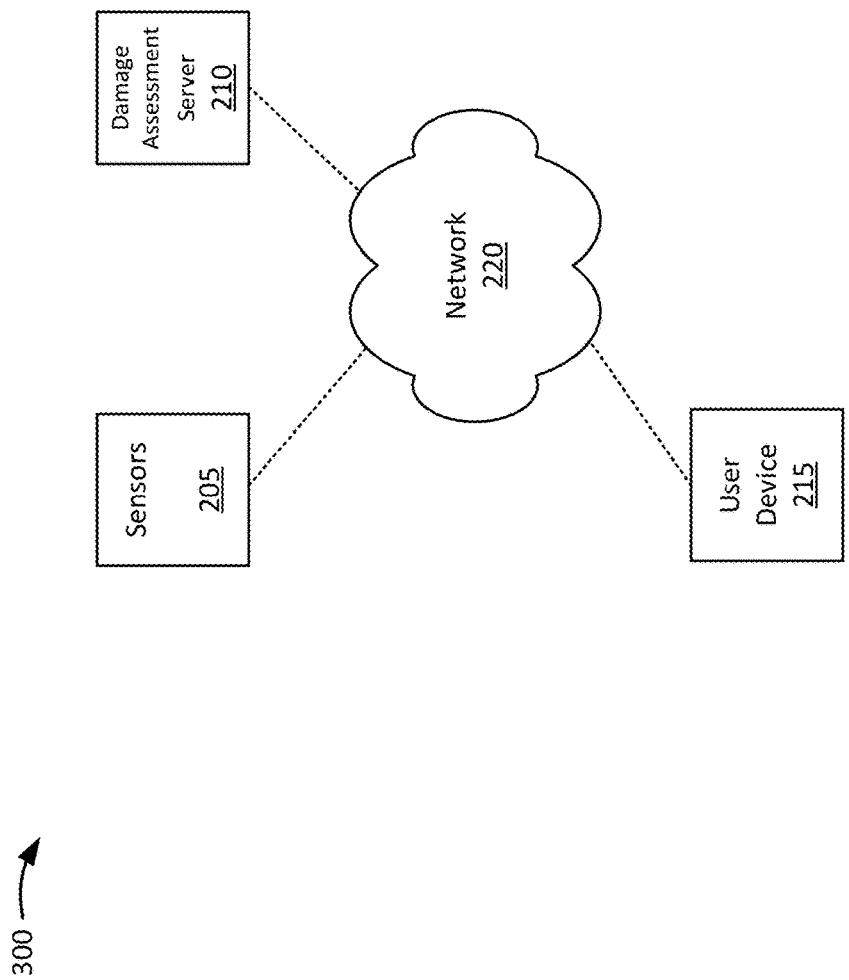
FIG. 2 shows an example environment in accordance with aspects of the present invention.

FIG. 2 shows an example environment in accordance with aspects of the present invention. As shown in FIG. 2, environment 300 may include sensors 205, a damage assessment server 210, a user device 215, and/or a network 220. In embodiments, one or more components in environment 300 may correspond to one or more components in the cloud computing environment of FIG. 2.

Sensors 205 may include any number and combination of sensors that may capture image-related data. In embodiments, the sensors 205 may include Electro-optical (EO) sensors (e.g., single and/or oblique/stereo), infrared imaging sensors, ultraviolet imaging sensor, Light Detection and Ranging (LiDAR) sensors, Synthetic Aperture Radar (SAR) sensors, cameras, electromagnetic (EM) sensors, odor detection sensors, radiation sensors, and/or other types of sensors. Each data point of the sensor data may include multiple attributes, such as location, color, etc. In embodiments, the sensors 205 may be implemented in aerial vehicles. In alternative embodiments, the sensors 205 may be implemented in ground and/or marine vehicles (e.g., autonomous vehicles).

The damage assessment server 210 may include one or more server devices that receive sensor data from the sensors 205. As described herein, the damage assessment server 210 may process the sensor data by forming imagery from the sensor data and analyzing the sensor data by isolating features of interest to form 3D shapes. In embodiments, the damage assessment server 210 may identify objects from the 3D shapes, and filter out objects that are not of interest (e.g., objects that are not assets). Further, the damage assessment server 210 may identify the types of assets, infer the location of obscured assets (e.g., assets that may not be visible as a result of obstructions, such as trees, buildings etc.), assess the features of the assets to determine the condition of the assets, and determine the types of defects associated with the assets.

The user device 215 may include one or more computing devices that receive information regarding damaged assets from the damage assessment server 210 (e.g., subsequent to the damage assessment server 210 processing the sensor data). The user device 215 may implement an application that displays the received information regarding damaged assets in a variety of different formats, as described in greater detail herein.

The network 220 may include one or more wired and/or wireless networks. For example, the network 220 may include a cellular network (e.g., a second generation (2G) network, a third generation (3G) network, a fourth generation (4G) network, a fifth generation (5G) network, a long-term evolution (LTE) network, a global system for mobile (GSM) network, a code division multiple access (CDMA) network, an evolution-data optimized (EVDO) network, or the like), a public land mobile network (PLMN), and/or another network. Additionally, or alternatively, the network 220 may include a local area network (LAN), a wide area network (WAN), a metropolitan network (MAN), the Public Switched Telephone Network (PSTN), an ad hoc network, a managed Internet Protocol (IP) network, a virtual private network (VPN), an intranet, the Internet, a fiber optic-based network, and/or a combination of these or other types of networks.

The quantity of devices and/or networks in the environment 300 is not limited to what is shown in FIG. 2. In practice, the environment 300 may include additional devices and/or networks; fewer devices and/or networks; different devices and/or networks; or differently arranged devices and/or networks than illustrated in FIG. 2. Also, in some implementations, one or more of the devices of the environment 300 may perform one or more functions described as being performed by another one or more of the devices of the environment 300. Devices of the environment 300 may interconnect via wired connections, wireless connections, or a combination of wired and wireless connections.

Figure 3:
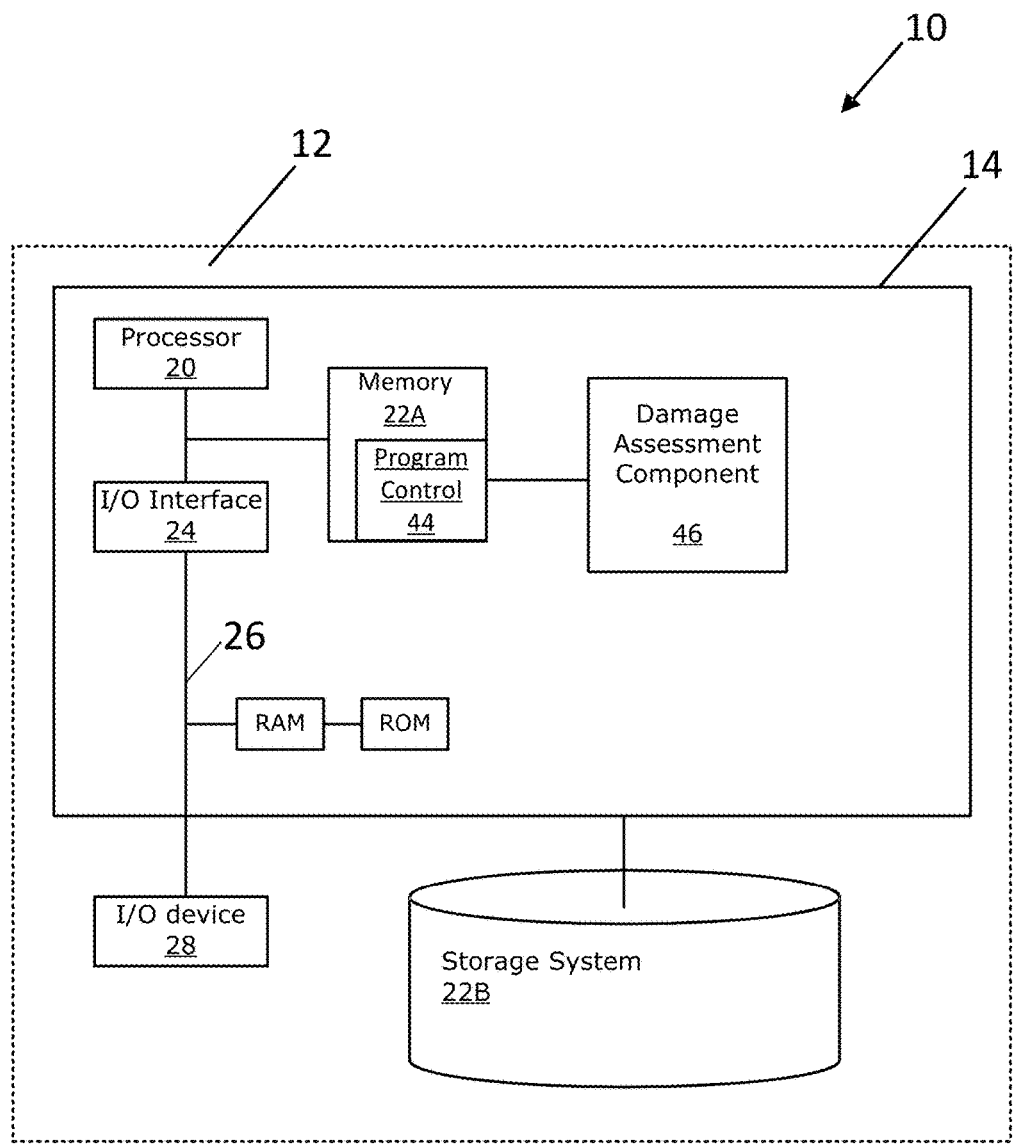
FIG. 3 shows an illustrative environment for managing the processes in accordance with aspects of the invention.

FIG. 3 shows an illustrative environment 10 for managing the processes in accordance with the invention. To this extent, environment 10 includes a server 12 or other computing system that can perform the processes described herein. In particular, server 12 can perform the processes of the damage assessment server 210. In embodiments, the server 12 includes a computing device 14. The computing device 14 can be resident on a network infrastructure or computing device of a third party service provider (any of which is generally represented in FIG. 3).

The computing device 14 includes a processor 20 e.g., CPU), memory 22A, an I/O interface 24, and a bus 26. The memory 22A can include local memory employed during actual execution of program code, bulk storage, and cache memories which provide temporary storage of at least some program code in order to reduce the number of times code must be retrieved from bulk storage during execution. In addition, the computing device includes random access memory (RAM), a read-only memory (ROM), and an operating system (O/S).

The computing device 14 is in communication with external I/O device/resource 28 and storage system 22B. For example, I/O device 28 can comprise any device that enables an individual to interact with computing device 14 (e.g., user interface) or any device that enables computing device 14 to communicate with one or more other computing devices using any type of communications link. The external I/O device/resource 28 may be, for example, a handheld device, PDA, handset, keyboard etc.

In general, processor 20 executes computer program code e.g., program control 44), which can be stored in memory 22A and/or storage system 22B. The processor 20 may be used to execute a computer program product for automatically assessing damage to infrastructure. The computer program product may include a computer readable storage medium having program instructions embodied therewith. The program instructions are executable to implement processes of the current invention, as described herein. Also, different types of computer readable storage media may be used, and the computer readable storage media is not a signal per se.

Moreover, in accordance with aspects of the invention, program control 44 controls a damage assessment component 46, e.g., the processes described herein. For example, damage assessment component 46 can implement the processes described in connection with the damage assessment server 210 (e.g., server 12). The damage assessment component 46 can be implemented as one or more program code in program control 44 stored in memory 22A as separate or combined modules. Additionally, the damage assessment component 46 may be implemented as separate dedicated processors or a single or several processors to provide the function of these tools. The storage system 22B can store imagery data, location data, sensor data, and other information as described herein. In this way, for example, the sensor data can be obtained and stored in the storage system 22B for later access and analysis. For example, the sensor data can be accessed in order for assets to be identified, located, and assessed for damaged.

While executing the computer program code, the processor 20 can read and/or write data to/from memory 22A, storage system 22B, and/or I/O interface 24. Storage system 22B can include information associated with the cache, as described herein. The program code executes the processes of the invention, which can be provided as a computer program product stored on the computer readable storage medium. The bus 26 provides a communications link between each of the components in computing device 14.

The computing device 14 can comprise any general purpose computing article of manufacture capable of executing computer program code installed thereon e.g., a personal computer, server, etc.). However, it is understood that computing device 14 is only representative of various possible equivalent-computing devices that may perform the processes described herein. To this extent, in embodiments, the functionality provided by computing device 14 can be implemented by a computing article of manufacture that includes any combination of general and/or specific purpose hardware and/or computer program code. In each embodiment, the program code and hardware can be created using standard programming and engineering techniques, respectively.

Similarly, server 12 is only illustrative of various types of computer infrastructures for implementing the invention. For example, in embodiments, server 12 comprises two or more computing devices e.g., a server cluster) that communicate over any type of communications link, such as a network, a shared memory, or the like, to perform the process described herein. Further, while performing the processes described herein, one or more computing devices on server 12 can communicate with one or more other computing devices external to server 12 using any type of communications link. The communications link can comprise any combination of wired and/or wireless links; any combination of one or more types of networks e.g., the Internet, a wide area network, a local area network, a virtual private network, etc.); and/or utilize any combination of transmission techniques and protocols.

Figure 4:
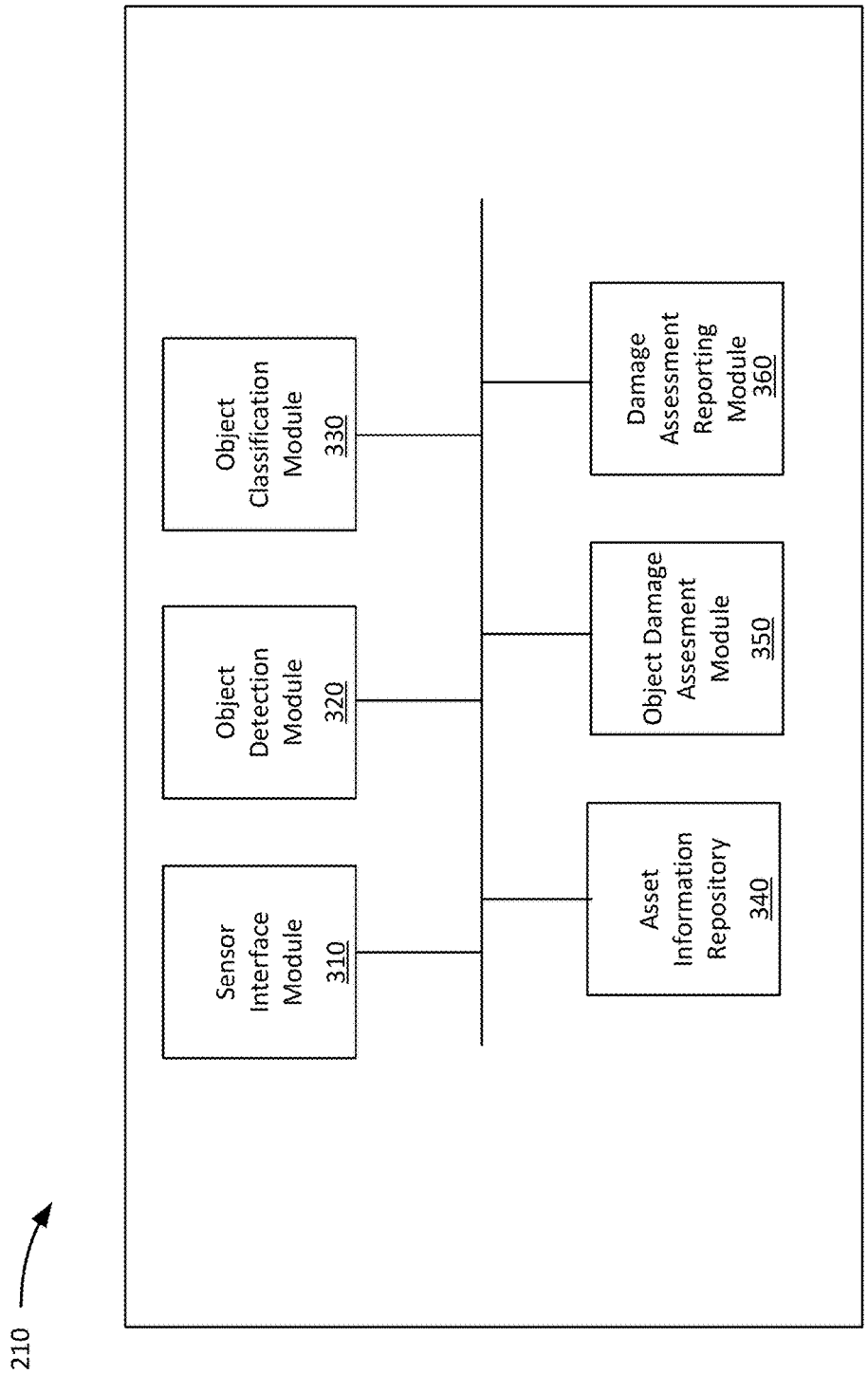
FIG. 4 shows a block diagram of example components of a damage assessment server in accordance with aspects of the present invention.

FIG. 4 shows a block diagram of example components of a damage assessment server in accordance with aspects of the present invention. As shown in FIG. 4, the damage assessment server 210 may include a sensor interface module 310, an object detection module 320, an object classification module 330, an asset information repository 340, an object damage assessment module 350, and/or a damage assessment reporting module 360. In embodiments, the damage assessment server 210 may include additional or fewer components than those shown in FIG. 4. In embodiments, separate components may be integrated into a single computing component or module. Additionally, or alternatively, a single component may be implemented as multiple computing components or modules.

The sensor interface module 310 may include a program module (e.g., a program control 44 of FIG. 3) that receives sensor data from the sensors 205. In embodiments, the sensor interface module 310 may include communications hardware to receive the sensor data sensors 205 via the network 220. In embodiments, the sensor interface module 310 may implement any combination of security protocols to authenticate the sensor data and/or permit the sensors 205 to communicate with the damage assessment server 210. As described herein, the sensor data may be used to form 3D imagery of objects and their appearances in their current state (e.g., at a time when sensor data is gathered, such as after a natural disaster).

The object detection module 320 may include a program module (e.g., a program control 44 of FIG. 3) that identifies objects based on the sensor data received by the sensor interface module 310. As described above, aerial pictures may only provide a 2D representation, which may be insufficient to properly assess damage to infrastructure. Accordingly, the object detection module 320 may generate 3D images of objects based on the sensor data. For example, the sensor interface module 310 may fuse 2D and 3D data to provide RGB-D imagery (e.g., fused imagery). The fused imagery gives rise to a cloud of data points corresponding to the raw sensor data received by the sensor interface module 310. The fused imagery may include position information, color, and/or other information. Additionally, the fused imagery may include navigational information (e.g., altitude, pitch, roll, yaw, speed, camera angles, etc).

The object detection module 320 may apply adaptive filters to select points matching statistical values and search criteria (e.g., known criteria relating to the shape infrastructure assets). Also, the object detection module 320 may apply line finding algorithms to the fused imagery. In embodiments, the object detection module 320 may collect adjacent points of the sensor data to determine three dimensional candidate shapes represented by the adjacent points. In embodiments, the object detection module 320 may utilize knowledge regarding known asset locations to analyze sensor data from geographic areas in which assets are located (e.g., to reduce the amount of processing resources by focusing on sensor data from geographic locations that have the assets of interest). In further embodiments, the object detection module 320 may combine nearby shapes and may infer missing sections of an object to better identify the object. The object detection module 320 may also infer the location of assets that may be obscured (e.g., by trees and/or other obstructions). The object detection module 320 may also decipher the location of an asset if the asset is not in an expected location (e.g., if the asset has been displaced from its expected location, or if information regarding the expected location is otherwise incorrect).

The object classification module 330 may include a program module (e.g., a program control 44 of FIG. 3) that analyzes the attributes of an object based on, e.g., the shape, dimensions, etc., and identifies which objects are of assets of interest. For example, the object classification module 330 may compare the attributes of an object with the known attributes of assets stored by the asset information repository 340 (e.g., storage system 22B). When the attributes of the object match, to a particular degree, the known attributes of an asset, the object classification module 330 may determine that the object is an asset. Further, the object classification module 330 may classify the asset as a particular type (e.g., by comparing the attributes of the asset with the attributes of known asset types). In embodiments, the object classification module 330 may classify the asset based on one or more classification rules. As an example, the object classification module 330 may classify the asset as a utility pole when the object has dimensions matching that of a utility pole (e.g., a long, slender object). A non-exhaustive list of examples of classification rules are provided below:

- Objects shaped as line segments may be classified as utility poles based on expected/inferred location, shape size, shape orientation, 3D position, and logical connectivity. Line segments representing utility poles may be extended through missing segments.
- Objects shaped as line segments that start at/near the ground may be classified as poles.
- Objects shaped as line segments that are a threshold length (e.g., 20 feet) or greater may be classified as poles.
- Objects shaped as line segments extending generally vertical may be classified as poles.
- Objects shaped as line segments with width/diameter greater than a threshold value (e.g., 6") may be classified as poles.
- Objects shaped as line segments starting at or near expected or inferred location may be classified as poles.
- Objects shaped as line segments relatively short line segments less than a particular threshold (e.g., 10 ft. or less) at/near top of pole likely a cross arm.
- Objects shaped as line segments relatively long thin line segments may be classified as wires.

In embodiments, the object classification module 330 may determine candidate objects, and generate scores for each candidates object. The scores indicate the confidence that the object is the candidate object. In embodiments, the scores may be based on the level at which the attributes of the object match the known attributes of the object, or match classification rules. In embodiments, the object classification module 330 may iteratively identify assets by using fuzzy logic and matching techniques to determine that an object may be an asset by comparing the object with known attributes of the asset. At a subsequent iteration, the object classification module 330 may further analyze the object to determine whether the object is an asset, and may then classify those objects that are determined to be assets.

The asset information repository 340 may include a storage device (e.g., the storage system 22B of FIG. 3) that stores information regarding assets. For example, the asset information repository 340 may store information identifying the location of assets, the attributes of assets, and the types of assets based on the attributes. Information stored by the asset information repository 340 may be used to narrow down the analysis of sensor data. For example, analysis of sensor data may be focused for sensor data associated with geographic locations in which assets are known to be deployed. In this way, sensor data need not be analyzed in all areas, thereby reducing computing resources. Also, information used by the asset information repository 340 may be used to classify assets and assess damage to assets.

The object damage assessment module 350 may include a program module (e.g., a program control 44 of FIG. 3) that may assess the damage of an asset. For example, when an asset has been identified and classified from sensor data, the object damage assessment module 350 may analyze the object formed from the sensor data to determine the damage to the asset. In an embodiment, the object damage assessment module 350 may compare the attributes of the asset in its current state with the known attributes of an undamaged asset. The severity of the damage may be determined based on the level of deviation from the attributes of the asset in its current state to the known attributes of an undamaged asset.

The damage assessment reporting module 360 may include a program module (e.g., a program control 44 of FIG. 3) that consolidates information regarding the location of assets and the damage to the assets. For example, the damage assessment reporting module 360 may generate a report identifying, for each asset, the asset's location and the asset's condition. In embodiments, the damage assessment reporting module 360 may output the report for display on the user device 215. As described herein, the report may be in any variety of formats, such as a chart, a geographical map, a heat map, etc.

Figure 5:
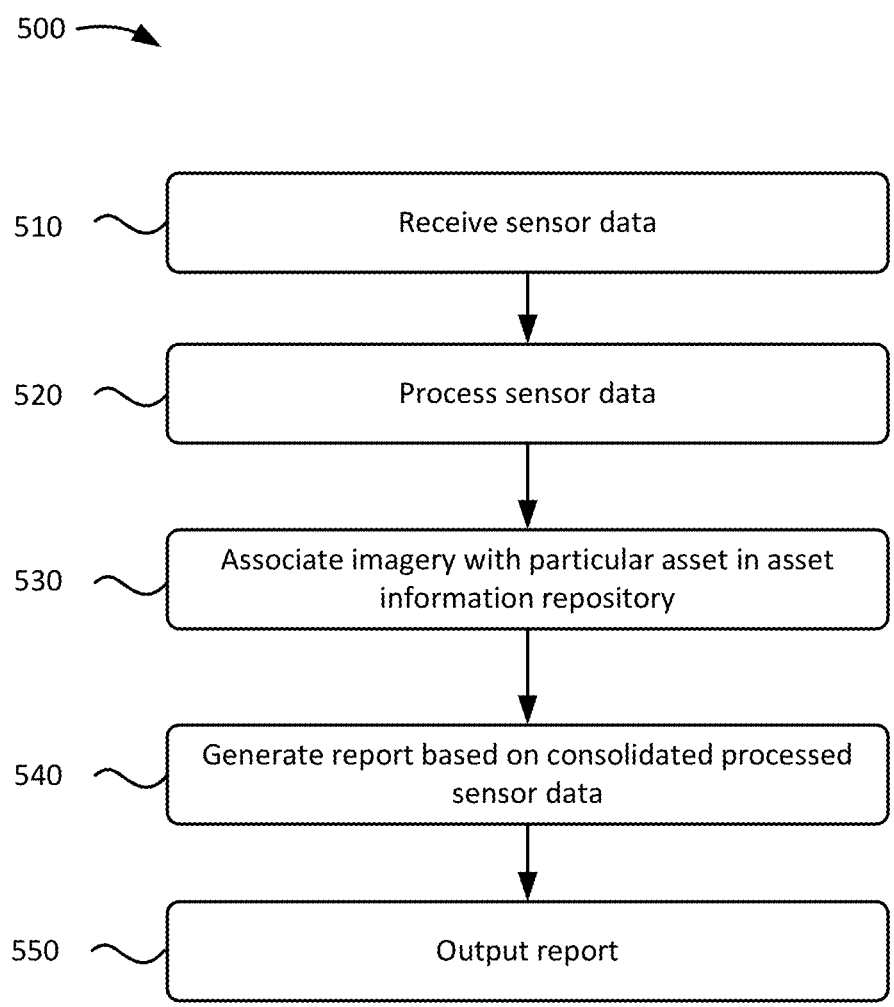
FIG. 5 shows an example flowchart for automatically assessing the damage of infrastructure assets in accordance with aspects of the present invention.

FIG. 5 shows an example flowchart for automatically assessing the damage of infrastructure assets in accordance with aspects of the present invention. The steps of FIG. 5 may be implemented in the environments of FIGS. 2-4, for example, and are described using reference numbers of elements depicted in FIGS. 2-4. As described herein, the flowchart illustrates the architecture, functionality, and operation of possible implementations of systems, methods, and computer program products according to various embodiments of the present invention.

As shown in FIG. 5, process 500 may include receiving sensor data (at step 510). For example, as described above with respect to the sensor interface module 310, the damage assessment server 210 may receive the sensor data from the sensors 205. As described herein, the sensors 205 may be implemented in one or more aerial vehicles that surveys a geographic location in which infrastructure assets may be damaged (e.g., as a result of a natural disaster and/or other event).

At step 520, the sensor data is processed. For example, the damage assessment server 210 may process the sensor data by forming 3D objects/imagery from the sensor data, as described above with respect to the object detection module 320. The damage assessment server 210 may further process the data by identifying the attributes of the objects, classifying objects as assets, and further classifying assets based on type. For example, at step 530, the damage assessment server 210 may classify the asset by associating the imagery with a particular asset type in the asset information repository 340. The damage assessment server 210 may assess the damage to an asset by comparing the attributes of the asset to a set of known attributes for an undamaged asset.

At step 540, a report is generated based on consolidated processed sensor data. For example, as described above with respect to the damage assessment reporting module 360, the damage assessment server 210 may generate a report identifying the location of assets and their damage. In embodiments, the damage assessment server 210 may store information that identifies an asset (e.g., an asset identifier), the type of asset, the location of the asset (e.g., address, longitude/latitude coordinates), and/or the damage to the asset. In embodiments, processed sensor data may also be output to external systems (e.g., via API calls), to computer files, and/or in some other format that may or may not include a report.

At step 550, the report is outputted (e.g., to other devices). For example, as described above with respect to the damage assessment reporting module 360, the damage assessment server 210 may output the report for display on the user device 215. As described herein, the report may be displayed in a variety of formats. For example, the report may be a table that identifies assets and their identifiers, locations, and damage. In embodiments, the report may be a map or satellite view with information regarding asset damage overlaid on the map. Based on the report, an administrator may validate the findings and dispatch the best-suited personnel and equipment for repairing damaged assets to the locations of the assets.

Figure 6:
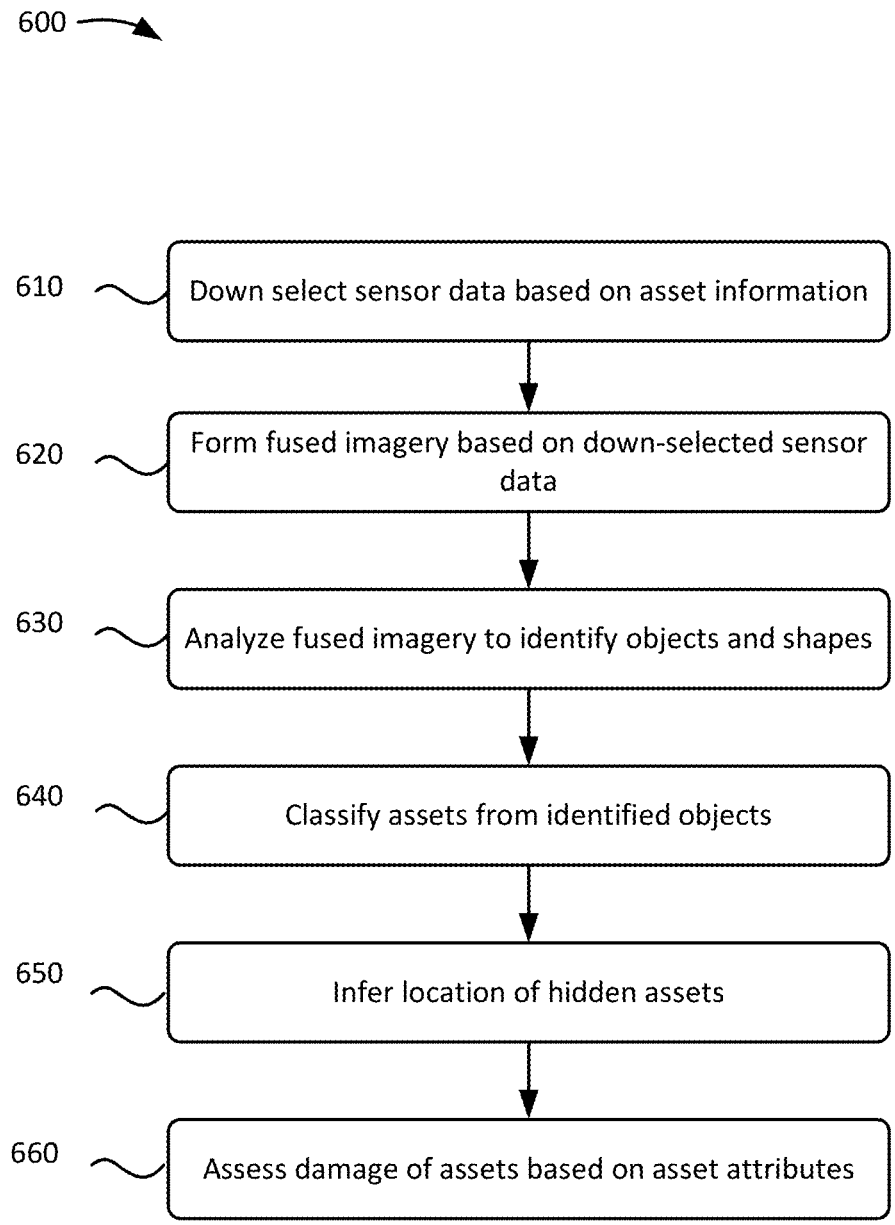
FIG. 6 shows an example flowchart for processing sensor data in accordance with aspects of the present invention.

FIG. 6 shows an example flowchart for processing sensor data in accordance with aspects of the present invention. The steps of FIG. 6 may be implemented in the environments of FIGS. 2-4, for example, and are described using reference numbers of elements depicted in FIGS. 2-4. In embodiments, the process of FIG. 6 may be a sub-process for process step 520 as described in FIG. 5. As described herein, the flowchart illustrates the architecture, functionality, and operation of possible implementations of systems, methods, and computer program products according to various embodiments of the present invention.

As shown in FIG. 6, process 600 may include down selecting sensor data based on asset information (at step 610). For example, during collection of the sensor data, the sensors 205 are continuously capturing data even when no assets are in view. For example, a relatively large portion of the sensor data may not contain imagery data for assets (e.g., depending on the density of the number of assets in the sensor data collection region). Therefore, the damage assessment server 210 may down select the sensor data associated with locations in which assets are expected to be present, thereby reducing the processing resources used to assess damage to assets.

As described herein with respect to the object detection module 320 and the asset information repository 340, the damage assessment server 210 may down select the sensor data for further analysis based on information stored by the asset information repository 340 identifying the expected location, dimensions and/or other metadata associated with the assets. In embodiments, the damage assessment server 210 may further down select the sensor data associated with a geographic location within a particular boundary (e.g., a boundary within which an asset is expected to be located). In embodiments, the damage assessment server 210 may optionally sort or prioritize sensor data sets based on the best expected or centered view of assets (e.g., assets that are center of frame). For example, sensor data within boundaries with the best and most centered view of assets may be prioritized for analysis. The down-selected sensor data includes a compact volume of interest (VOI) extracted from a larger set of sensor data.

At step 620, fused imagery is formed based on the down-selected sensor data. For example, the fused imagery consists of a cloud of points, where each point may include multiple attributes, such as location, color, etc. The cloud of points may define a 3D space. The fused imagery may include a collection of data across multiple files or sets of sensor data.

In embodiments, the damage assessment server 210 may form fused imagery which gives rise to 3D objects. In embodiments, the fused imagery is formed by fusing 2D data with 3D data to provide RGB-D data. Additionally, or alternatively, the object detection module 320 may apply adaptive filters to select points matching statistical values and search criteria (e.g., known criteria relating to the shape infrastructure assets). Also, the damage assessment server 210 may apply line finding algorithms to the fused imagery.

In embodiments, the damage assessment server 210 may collect adjacent points of the sensor data to determine candidate shapes represented by the adjacent points. In embodiments, the damage assessment server 210 may utilize knowledge regarding known asset locations to analyze sensor data from geographic areas in which assets are located (e.g., to reduce the amount of processing resources by focusing on sensor data from geographic locations that have the assets of interest). In embodiments, the damage assessment server 210 may combine nearby shapes and may infer missing sections of an object to better identify the object.

At step 630, the fused imagery is analyzed to identify objects and shapes. For example, as described above with respect to the object classification module 330, the damage assessment server 210 may analyze the attributes of an object based (e.g., the shape, dimensions, etc.), and identify which objects are assets of interest. For example, the damage assessment server 210 may compare the attributes of an object with the known attributes of assets stored by the asset information repository 340. When the attributes of the object match, to a particular degree, the known attributes of an asset, the damage assessment server 210 may determine that the object is an asset. The damage assessment server 210 may retain the sensor data and associated 3D imagery corresponding to assets while discarding the sensor data that is not associated with assets.

At step 640, the assets are classified. For example, as described above with respect to the object classification module 330, the damage assessment server 210 may classify the asset as a particular type (e.g., by comparing the attributes of the asset with the attributes of known asset types). As an example, the damage assessment server 210 may classify the asset as a utility pole when the object has dimensions matching that of a utility pole (e.g., a long, slender object). In embodiments, the damage assessment server 210 may determine candidate objects, and generate scores for each candidates object. The scores indicate the confidence that the object is the candidate object. In embodiments, the scores may be based on the level at which the attributes of the object match the known attributes of the object. In embodiments, an arbitration process may be used to classify assets. For example, multiple alternative classifications may be considered, with appropriate confidence levels calculated, and arbitration processes may be used to select the most likely correct classification based on available information.

At step 650, the location of obscured assets is inferred. For example, the damage assessment server 210 may infer the location of assets that may be obscured (e.g., by trees and/or other obstructions). The damage assessment server 210 may also decipher the location of an asset if the asset is not in an expected location (e.g., if the asset has been displaced from its expected location, or if information regarding the expected location is otherwise incorrect). As an example, the location of an obscured asset (e.g., a utility pole) may be inferred based on the electrical line intersections between two non-obscured assets between which the obscured asset is located. Illustrative examples of inferring the location of an obscured asset are described in greater detail below with respect to FIGS. 10-12. Information regarding obscured assets may be used to update the asset information repository 340. Also, obscured assets may be identified in a damage assessment report so that repair personnel know to visually inspect the obscured asset.

At step 660, damage of assets is assessed based on the attributes of the assets. For example, as described above with respect to the object damage assessment module 350, the damage assessment server 210 may analyze the asset formed from the sensor data to determine the damage to the asset. In an embodiment, the object damage assessment module 350 may compare the attributes of the asset in its current state with the known attributes of an undamaged asset. The severity of the damage may be determined based on the level of deviation from the attributes of the asset in its current state to the known attributes of an undamaged asset. In embodiments, the damage assessment server 210 may determine the type or extent of damage (e.g., a leaning or displaced utility pole, impact to electrical wires, etc.). The type of damage may be used to dispatch the best-suited repair personnel and equipment to repair the asset.

Figure 7:
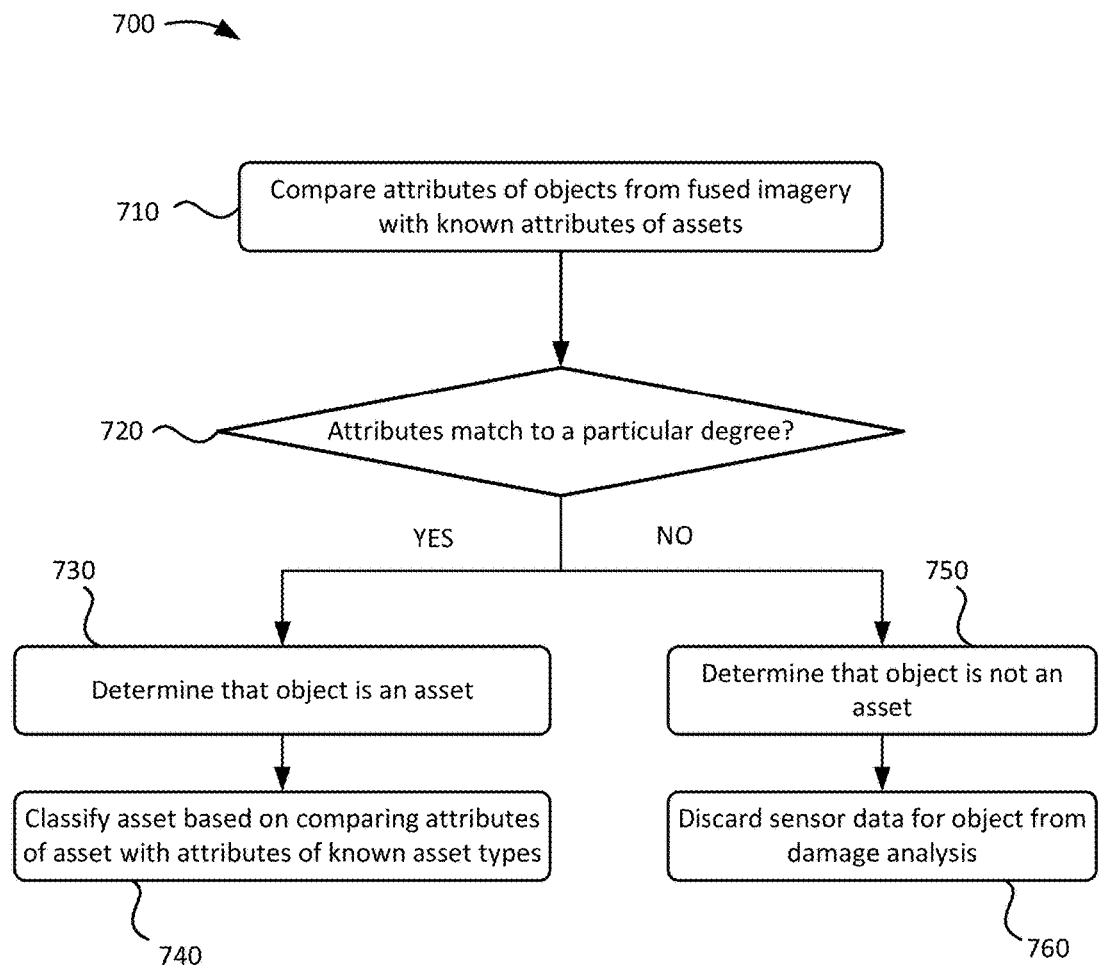
FIG. 7 shows an example flowchart for identifying and classifying assets from sensor data in accordance with aspects of the present invention.

FIG. 7 shows an example flowchart for identifying and classifying assets from sensor data in accordance with aspects of the present invention. The steps of FIG. 7 may be implemented in the environments of FIGS. 2-4, for example, and are described using reference numbers of elements depicted in FIGS. 2-4. In embodiments, the process of FIG. 7 may be a sub-process for process steps 630 and 640 as described in FIG. 7. As described herein, the flowchart illustrates the architecture, functionality, and operation of possible implementations of systems, methods, and computer program products according to various embodiments of the present invention.

As shown in FIG. 7, process 700 may include comparing attributes of an object from fused imagery with known attributes of assets (step 710). For example, as described above with respect to the object classification module 330, the damage assessment server 210 may compare the attributes of an object with the known attributes of assets stored by the asset information repository 340. At step 710, multiple algorithms may be independently applied.

At step 720, a determination is made as to whether the attributes match to a particular degree. For example, the damage assessment server 210 may determine whether the attributes of the object match the known attributes of the assets to a particular degree (e.g., a 90% match, 80% match, etc.). In embodiments, the threshold of matching may be a tradeoff between accuracy and thoroughness. For example, a lower threshold is more likely to identify more assets, but may be more likely to erroneously identify an object as an asset. A higher threshold is more likely to correctly identify an object as an asset, but may be more likely to erroneously identify an asset as a non-asset. At step 720, arbitration techniques may be used to resolve potential discrepancies and errors. If, for example, the attributes of the object match to the particular degree, or if arbitration has been used to resolve that the object is an asset, at step 730, the asset is classified based on comparing attributes of the asset with the attributes of known asset types at step 740. If, on the other hand, the attributes of the object do not match to the particular degree, or if arbitration has been used to resolve that the object is not an asset, at step 750, the sensor data corresponding to the non-asset object is discarded from the damage analysis, at step 760.

Figure 8:
FIG. 8 shows an example of gathering sensor data from a defined flight path in accordance with aspects of the present invention.

FIG. 8 shows an example of gathering sensor data from a defined flight path in accordance with aspects of the present invention. As shown in FIG. 8, sensor data is gathered in a geographic area defined by a flight path 810. In embodiments, the flight path may be based on the location affected by a natural disaster or other event in which assets may be damaged. Also, the fight path may be based on the expected location of assets. In embodiments, the flight path may be determined based on a density of assets located in a geographic area and may not include geographic location of assets to ignore (e.g., low-density asset locations). In this way, collection of sensor data may be expedited by focusing on high-density asset locations (e.g., locations in which the density of assets satisfies a particular threshold).

Figure 9:
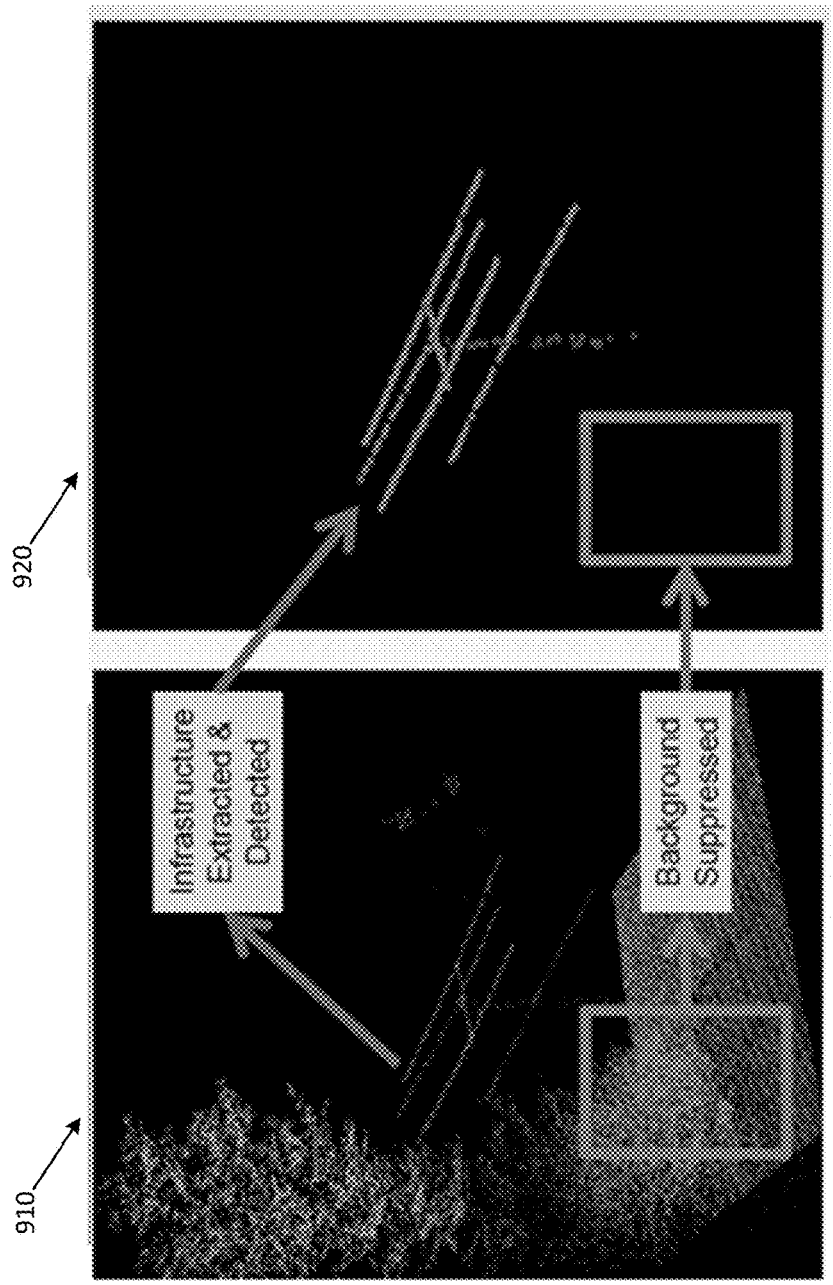
FIG. 9 shows an example of identifying an asset based on raw sensor data in accordance with aspects of the present invention.

FIG. 9 shows an example of identifying an asset based on raw sensor data in accordance with aspects of the present invention. As shown in view 910, raw sensor data gives rise to a cloud of data points. From the cloud of data points, an image of an infrastructure asset is extracted and detected. Also, background noise and data can be suppressed. Based on extracting the image of the infrastructure asset from the raw sensor data and removing background data, an image of the infrastructure asset (e.g., a utility pole and wires as shown in view 920) can be formed. From the image in view 920, the asset can be classified (e.g., as a utility pole with electrical wires) and assessed for damage.

Figure 10:
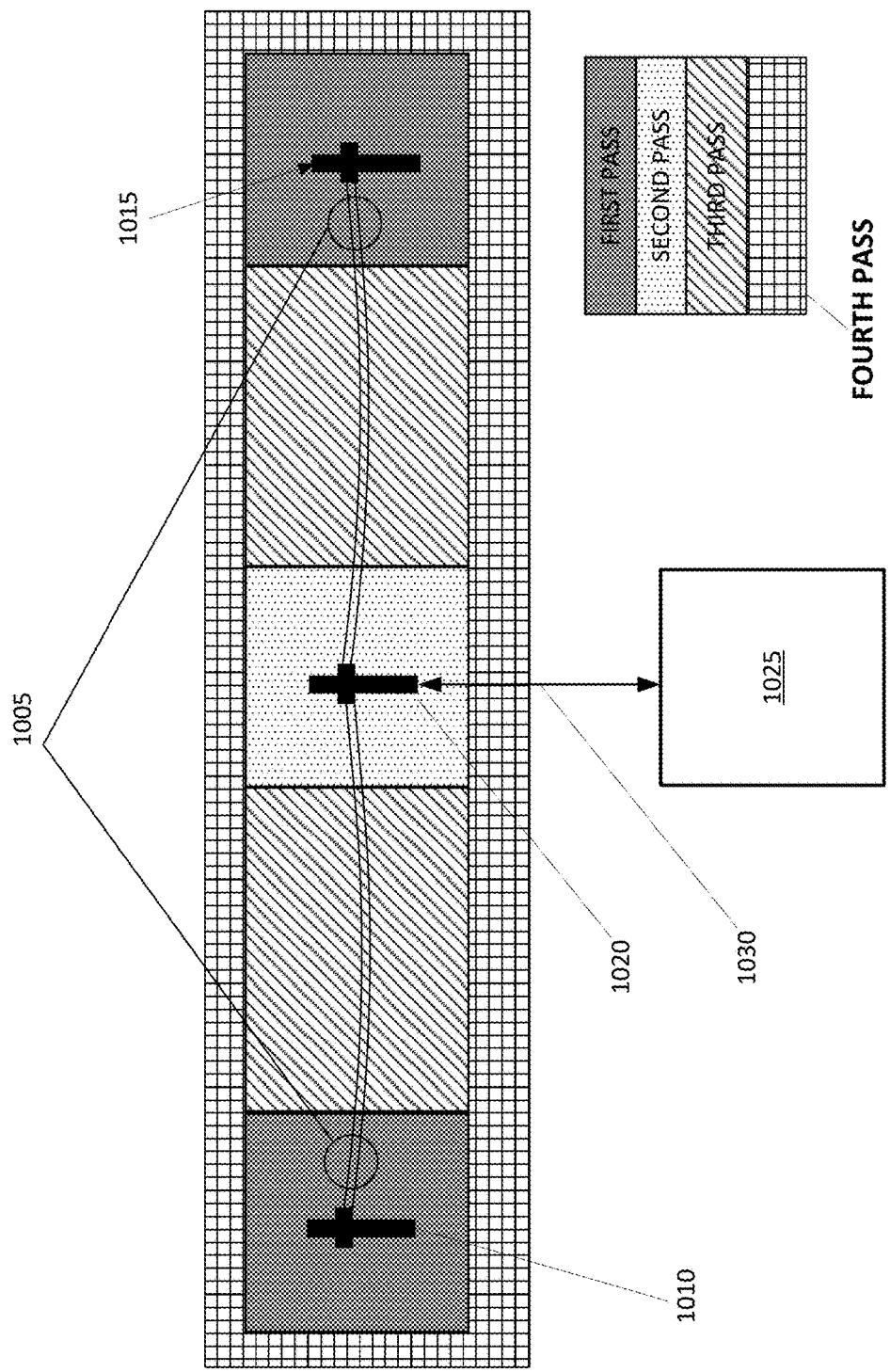
FIG. 10 shows an example of a multi-pass approach to account for inconsistencies between actual asset locations and stored asset locations in accordance with aspects of the present invention.

FIG. 10 shows an example of a multi-pass approach to account for inconsistencies between actual asset locations and stored asset locations, in accordance with aspects of the present invention. As described herein, information regarding the location of assets may be stored (e.g., by the asset information repository 340 of FIG. 4). The location information may sometimes be inaccurate for various reasons. Thus, sensor data may not capture the image of an asset that is not located in an expected location. Accordingly, aspects of the present invention may include a multi-pass approach to decipher the "true" or actual location of an asset when the asset is not located in an expected location. For example, the processes as described herein with respect to FIG. 10 can be used to infer a location of an asset by following wirelines and angles of the wirelines.

In an illustrative example shown in FIG. 10, assume that assets 1010 and 1015 are in their expected locations and that the location of asset 1020 exceeds an inconsistency margin (shown at arrow 1030) from its expected location 1025. Given these assumptions, assets 1010 and 1015 are detected from sensor data gathered after a first pass of a geographic region. Further, the orientations and angles of electrical wires connected to assets 1010 and 1020 are detected from the first pass. Search regions may be created around areas where line intersections 1005 are expected to occur based on previously detected line angles of neighboring assets.

During a second pass, these search regions are detected. In the example of FIG. 10, asset 1020 is detected. During a third pass, line finding methods are applied to detect power lines for all search regions between assets 1010 and 1015. For example, wires or power lines can be detected based on classification rules as described above with respect to the object classification module 330 of FIG. 4. Search regions in the third pass are located at incoming or outgoing line segments detected in previous passes. The areas where no line is found may be re-processed. Missed line detections may occur in areas of high noise which is often caused by foliage. In this case, lines detected in areas adjacent to noise/foliage can be used to create a more precise search region, possibly cylindrical in shape around the expected line location. A fourth pass may be made to finalize a determination as to the location between the asset 1020, and an expected location 1025 of the asset 1020. From this determination, the expected location 1025 of the asset 1020 can be updated (e.g., in the asset information repository 340 of FIG. 4).

In embodiments, additional techniques may be used to resolve inconsistencies between actual asset locations and expected asset locations. In embodiments, an administrator may score or vote to arbitrate candidate objects as true assets, and the corresponding locations may be stored. Further, the classifications of line segments connected to candidate objects that are identified as assets are updated to wires. Candidate asset locations may also be based on expected behavior in the utility domain.

In embodiments, actual asset location may be based on expected location and expected logical circuit connectivity information. In embodiments, the expected connectivity information may be provided by the asset information repository 340. Asset locations can also be inferred from the location of adjacent poles and logical circuit information. Additionally, or alternatively, asset locations can also be inferred from detected wire line segments. In embodiments, multi-pass techniques may be used to identify inconsistencies between asset information in the asset information repository 340, and actual asset locations.

Figure 11:
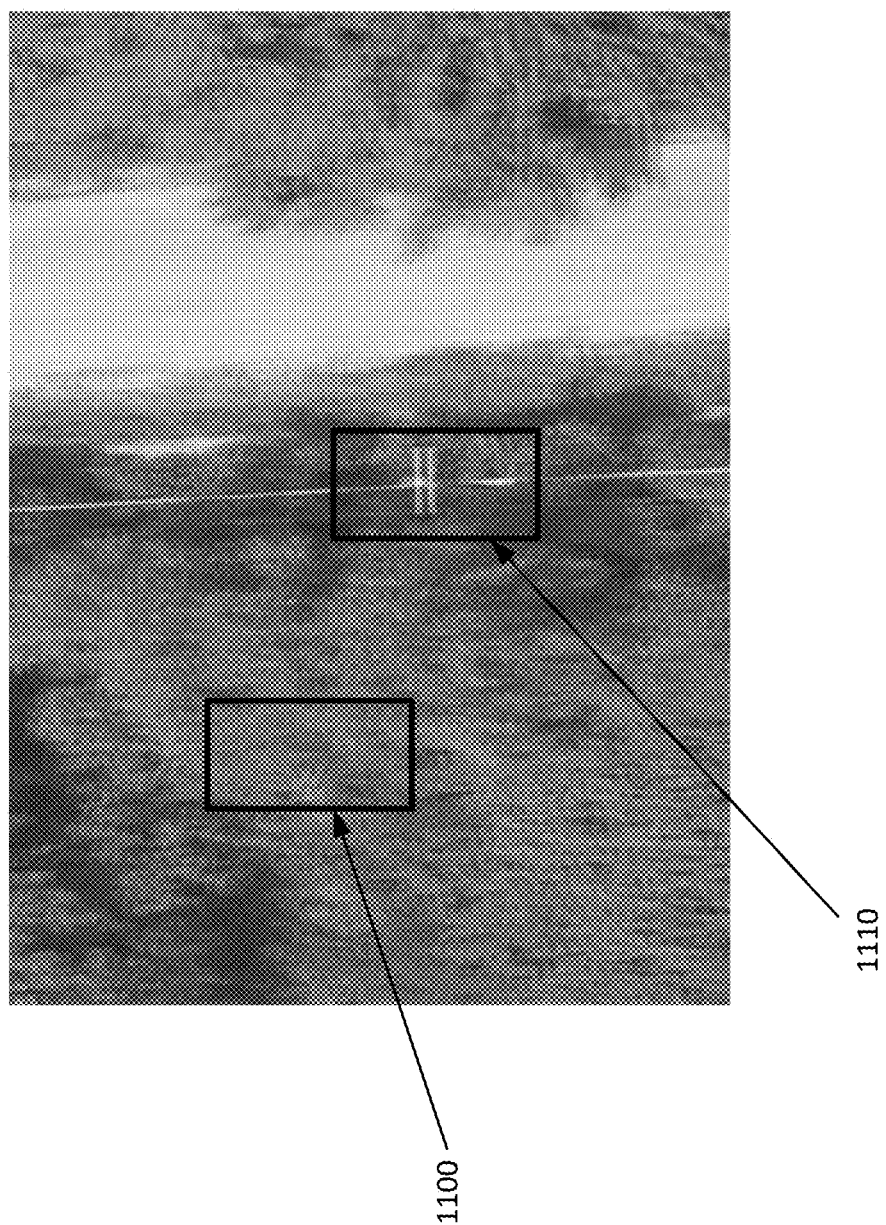
FIG. 11 shows an example of resolving the location of an obscured asset in accordance with aspects of the present invention.

FIG. 11 shows an example of resolving the location of an obscured asset in accordance with aspects of the present invention. As shown in FIG. 11, a satellite image shows the expected location of an asset within box 1100 in relation to the actual location of an asset within box 1110 (e.g., based on information stored by asset information repository 340). The true or actual location of the asset is determined based on resolving the location of the asset as described above with respect to FIG. 10.

Figure 12:
FIG. 12 shows an example of resolving the location of an asset in accordance with aspects of the present invention.

FIG. 12 shows an example of resolving the location of an asset in accordance with aspects of the present invention. As shown in FIG. 12, a satellite image shows the expected location of an asset (marked with an "X") in relation to the actual location of an asset (marked with an "A"). The satellite image with the notations of actual locations versus expected locations may be presented in a display of the user device 215.

Figure 13A:
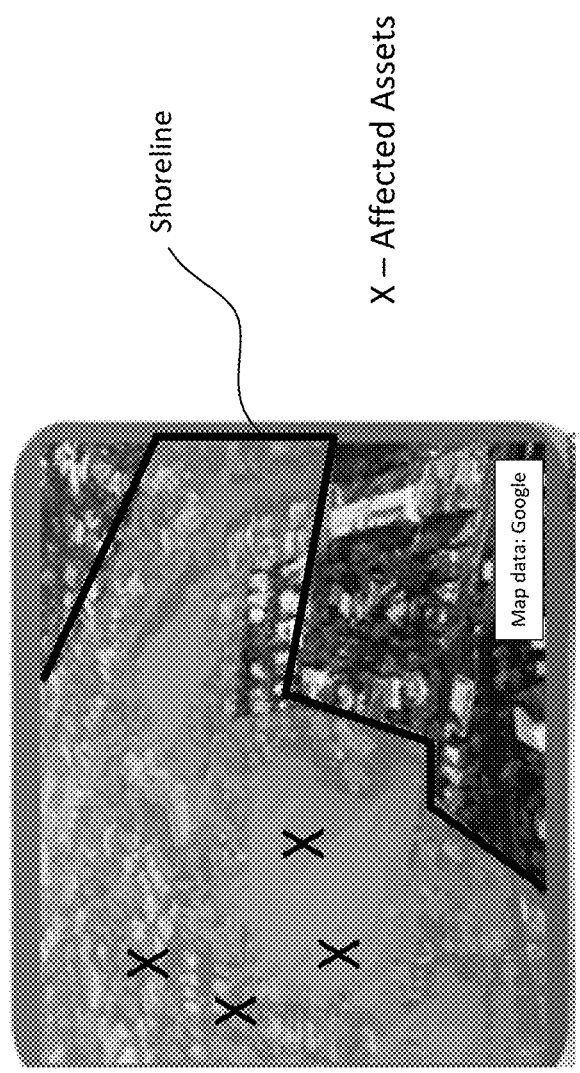
FIGS. 13A and 13B show examples of flood detection in accordance with aspects of the present invention.
Figure 13B:
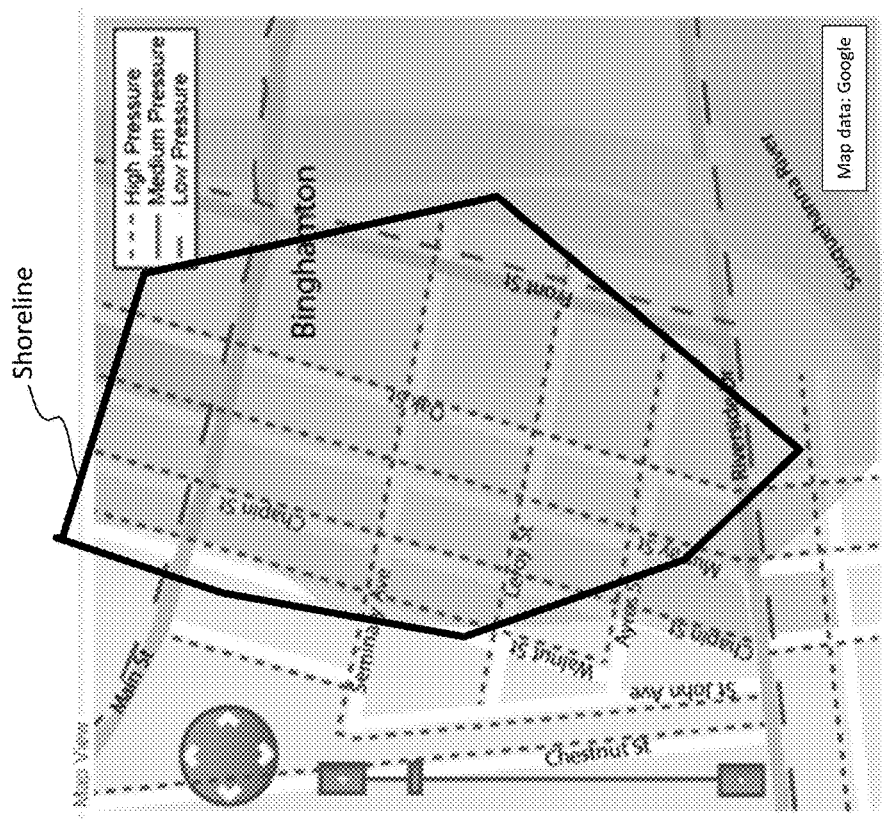

FIGS. 13A and 13B show examples of flood detection in accordance with aspects of the present invention. Typically, flood shorelines are viewed and manually marked on maps, and ground inspection is performed once flooding has abated. Aspects of the present invention may calculate the shoreline from sensor data, use information stored by the asset information repository 340 to identify the location of gas lines and/or other assets affected by flooding, and map the shorelines with the location of the assets to identify the assets that have been affected by flooding. Repair personnel may then be dispatched to the assets that have been affected by flooding. In embodiments, the damage assessment server 210 may overlay shorelines onto utility maps to identify affected assets. In embodiments, shorelines can be further manually manipulated based on a time of data collection to raise the collected water level thus creating a new geographic region based on the 3D terrain model collected from the 3D sensor data collection. Further, a shoreline may be determined based on the sensor data, time of collection of the sensor data, and/or known or provided calculated flood stage change.

Referring to FIG. 13A, sensor data may be used to identify a shoreline in a satellite image of a geographic area. Information regarding the known location of assets may be overlaid on the image, and assets within the shoreline may be identified (e.g., with the notation "X" as shown in FIG. 13A).

Figure 14:
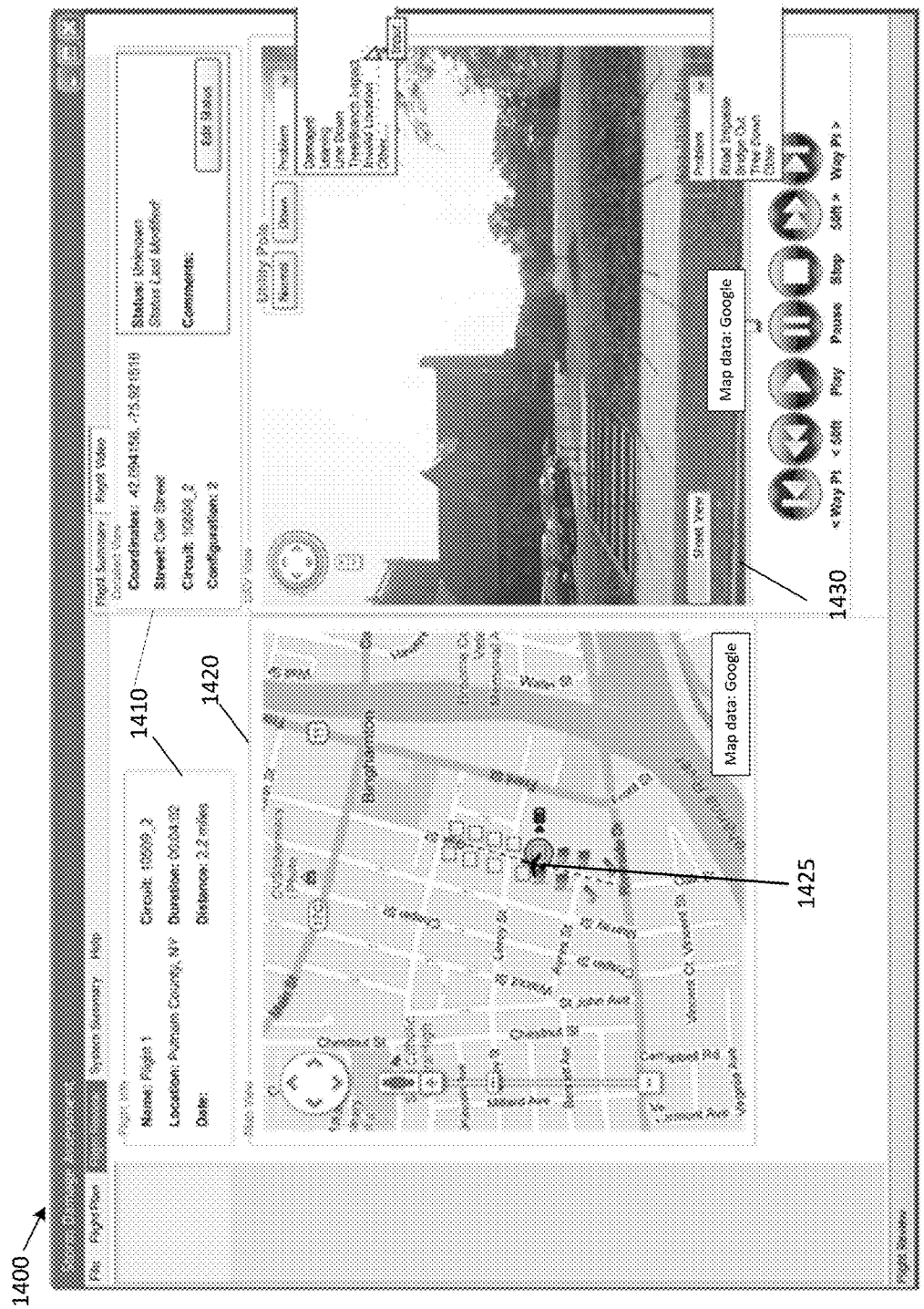
Figure 16:

Referring to FIG. 13B, a shoreline may be overlaid in a map of a geographic area. In embodiments, the shoreline may be laid in a map that also identifies assets, such as various types of gas lines (e.g., high pressure, medium pressure, and low pressure gas lines). From overlaying the boundary of the shoreline onto the map, particular gas lines and their types can be identified. Specifically, those pipeline sections that are operating at a pressure less than the estimated water pressure based on flooding extent and depth, and likely to have been compromised by water encroachment FIGS. 14-16 show example formats of damage assessment reports presented on a user device, in accordance with aspects of the present invention. Referring to FIG. 14, a damage assessment report 1400 may include a visual representation of information for a flight path from which sensor data is gathered (shown at windows 1410). For example, the windows 1410 may display a flight name, duration, data, distance, and other information regarding a flight path. The damage assessment report 1400 may also include a map that graphically displays the flight plan in a map (e.g., in a window 1420). For example, the window 1420 may include an icon 1425 identifying an aerial vehicle's position along a flight path. The damage assessment report 1400 may also include a window 1430 that displays a street view of a selected location. In embodiments, information shown in FIG. 14 may be used by an operator to review automatically determined assessments of asset condition, and may include an interface for the operator to provide their own assessment of the asset condition.

Referring to FIG. 15, a damage assessment report 1500 may display a summary of a flight path and a table indicating identifiers of assets (e.g., utility poles), circuit identifiers of the assets, configuration identifiers of the assets locations of the assets (e.g., county, street, longitude/latitude coordinates), and a status of the asset. The status of the assets indicates whether the assets are damaged or not damaged (e.g., "normal") as well as the type of damage (e.g. "leaning, "tree/branch impact").

Referring to FIG. 16, a damage assessment report 1600 may display a satellite view of a geographic area in which sensor data has been gathered and processed. Further, the damage assessment report 1600 may display a location of assets, and an indication as to whether the assets are damaged (e.g., indicated with an "X") or undamaged (e.g., indicated with an "O").

The presentation of damage assessment reports shown in FIGS. 14-16 can be modified as desired, and is not limited to what is shown in FIGS. 14-16. For example, the presentation of damage assessment reports may be manipulated in a manner similar to that of electronic design automation (EDA) domains in which a symbol of the schematic can be selected or highlighted and details can be shown for the corresponding component in the physical layout.

In embodiments, the damage assessment reports may combine views and information from multiple independent systems into a more a user-friendly and useful application for performing damage assessment. In embodiments, cross probing can be defined as a mechanism that appropriately selects, highlights, pans, and/or zooms each view/window in the damage assessment report such that an asset selected in one view is appropriately displayed in the other views. Selecting an asset on the table (e.g., a table similar to that shown in FIG. 15) will cause a map view to pan/zoom to display the corresponding location on the map, and will cause the image window to display an image corresponding to the selected asset and pan/zoom to the appropriate location. In embodiments, selecting an asset on the map window will cause the table window to scroll such that the corresponding asset is displayed and highlighted, and will cause the image window to display an image corresponding to the selected asset and pan/zoom to the appropriate location. In further embodiments, selecting a location on the image window will first determine the closest available asset to that location, in turn, causing the data sheet window to scroll such that the corresponding asset is displayed and highlighted, and the map to pan/zoom to feature the corresponding location on the map.

The damage assessment reports reduce the level of tediousness and errors associated with manually accessing multiple different systems for damage assessment. As a result, quality and throughput for performing damage assessment is improved, and reviewers may bypass alternative systems and views that may not be relevant to the task at hand of assessing damage to infrastructure. Time to perform damage assessment is reduced as the reviewer may not need to spend the type manually syncing multiple views. Also, focus can be directed to the most relevant and important information related to damage assessment.

In embodiments, the design of the damage assessment reports may provide capability for cross system/view communication. Affected systems may publicize/broadcast a message when a user selects an operation in its view. Other systems may monitor for this message, and may perform corresponding select/pan/zoom operations. For example, other systems may monitor for broadcast messages by using sockets or other inter process communication. Affected system creates scripts/macros to which the other systems then execute. In this way, multiple systems may utilize fused data representing 3D objects of assets.

Aspects of the present invention may assist a variety of service providers to expedite the assessment of infrastructure damage, which in turn, expedites the restoration of service. Potential benefiting parties may include utility providers (e.g., electric, gas, water, telephone, cable), energy distribution companies (e.g., pipelines, transmission lines), disaster response agencies (Federal Emergency Management Agency (FEMA), etc.), government agencies, and/or private organizations responsible for safety inspections in public facilities (e.g., roads, bridges, tunnels, roofs, parking garages). Aspects of the present invention may also support other domains in which a set of rules are established to define the condition of an asset. Aspects of the present invention may determine to condition of an infrastructure asset whether the infrastructure asset is in either located in an excepted location or an unexpected location. In embodiments, a baseline sample of the data may not be needed in order for damage assessment to be performed (e.g., damage assessment may not necessarily be based on a differential assessment from a baseline).

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein. Images and related data of aerial photographs and maps shown in one or more of the FIGS. are provided by Google.

What is claimed is:

1. A computer-implemented method comprising:
   receiving, by a computing device, sensor data associated with a geographic location;
   processing, by the computing device, the sensor data to identify an infrastructure asset within the geographic location, wherein processing the sensor data comprises:
   forming a first three-dimensional (3D) image of an object from the sensor data; and
   determining that the object represents the infrastructure asset based on comparing predefined attributes of the infrastructure asset with attributes of the object, wherein the infrastructure asset is located in either an excepted location or an unexpected location;
   determining, by the computing device, a condition of the infrastructure asset based on processing the sensor data;
   storing or outputting, by the computing device, information regarding the condition of the infrastructure asset;
   down selecting the sensor data based on information identifying a location of the infrastructure asset;
   processing the down-selected sensor data; and
   forming a second 3D image of the object based on the down-selected sensor data.

2. The method of claim 1, further comprising classifying the infrastructure asset based on one or more classification rules and the attributes of the object representing the infrastructure asset.

3. The method of claim 1, wherein determining the condition of the infrastructure asset comprises comparing the attributes of the object representing the infrastructure asset with predefined attributes of an undamaged infrastructure asset.

4. The method of claim 1, further comprising:
   determining a flight path for collection of the sensor data based on a density of infrastructure assets within one or more geographic locations,
   wherein the sensor data is received from a set of sensors implemented in an at least one of:
   an aerial vehicle that aerially surveys the geographic location;
   a ground-based vehicle;
   a surface or subsurface marine vehicle; and
   an unmanned vehicle.

5. The method of claim 4, wherein the sensor data includes at least one of:
   Light Detection and Ranging (LiDAR) data;
   Synthetic Aperture Radar (SAR) data;
   Electro-optical (EO) data;
   infrared imaging data;
   ultraviolet imaging data;
   radio frequency (RF) data;
   navigation data;
   electromagnetic data;
   chemical gas snigger data; and
   camera data.

6. The method of claim 1, further comprising inferring a location of the infrastructure asset.

7. The method of claim 6, wherein the inferring the location of the infrastructure asset includes:
   creating search areas around expected line intersections;
   detecting lines for the search regions and connected to previously detected infrastructure assets; and
   determining the inferred location of the infrastructure asset based on the detected lines connected to previously detected infrastructure assets or other derived or inferred information.

8. The method of claim 1, wherein storing or outputting information regarding the condition of the infrastructure asset includes generating a report identifying a location of the infrastructure asset and the condition of the infrastructure asset.

9. The method of claim 8, wherein the report includes at least one of:
   a map or satellite view of the geographic area; and a table identifying the infrastructure asset and the condition of the infrastructure asset.

10. A computer program product for automatically assessing damage to infrastructure, the computer program product comprising a non-transitory computer readable storage medium having program instructions embodied therewith, the program instructions executable by a computing device to cause the computing device to:
receive sensor data collected by a set of sensors implemented in a vehicle;
identify, based on the sensor data, an infrastructure asset within a geographic location surveyed by the vehicle, wherein identifying the infrastructure asset comprises:
forming a first three-dimensional (3D) image of an object from the sensor data; and
determining that the object represents the infrastructure asset based on a degree in which predefined attributes of the infrastructure asset match attributes of the object;
determine an extent of damage to the infrastructure asset based on processing the sensor data;
store or output a report indicating the extent of damage to the infrastructure asset
down select the sensor data based on information identifying a location of the infrastructure asset;
process the down-selected sensor data; and
form a second 3D image of the object based on the down-selected sensor data.

11. The computer program product of claim 10, wherein identify the infrastructure asset further comprises inferring a location of the infrastructure asset based on at least one of:
an expected location of the infrastructure asset;
a location of surrounding infrastructure assets; and
an inferred location of surrounding infrastructure assets.

12. The computer program product of claim 10, wherein determining the extent of damage to the infrastructure asset comprises comparing the attributes of the object representing the infrastructure asset with predefined attributes of an undamaged infrastructure asset.

13. The computer program product of claim 10, wherein the infrastructure asset include at least one of:
a utility pole;
an electrical distribution power line;
a communication line;
a guy wire;
a gas lines;
a water line; and
a communications tower.

14. The computer program product of claim 10, wherein the program instructions further cause the computing device to:
identify a shoreline based on the sensor data, time of collection of the sensor data, or known or provided calculated flood stage change; and
identify infrastructure assets within the shoreline.

15. A system comprising:
a CPU, a computer readable memory and a computer readable storage medium associated with a computing device;
program instructions to receive information regarding the extent of damage to an infrastructure asset, wherein the infrastructure asset is identified by:
forming a first three-dimensional (3D) image of an object from the sensor data; and
determining that the object represents the infrastructure asset based on a degree in which predefined attributes of the infrastructure asset match attributes of the object,
wherein the information regarding the extent of damage to the infrastructure asset is automatically determined via processing sensor data implemented in an aerial vehicle that surveys a geographic area defining an area affected by an event that causes damage to infrastructure;
program instructions to display the information regarding the extent of damage to the infrastructure asset,
program instructions to down select the sensor data based on information identifying a location of the infrastructure asset;
program instructions to process the down-selected sensor data; and
program instructions to form a second 3D image of the object based on the down-selected sensor data
wherein the program instructions are stored on the computer readable storage medium for execution by the CPU via the computer readable memory.

16. The system of claim 15, wherein displaying the information regarding the extent of the damage of the infrastructure asset includes displaying at least one of:
a map or satellite view of the geographic area; and
a table identifying the infrastructure asset and the extent of damage to the infrastructure asset.

* * * * *